United States Patent
Busse

(10) Patent No.: US 8,739,749 B2
(45) Date of Patent: Jun. 3, 2014

(54) NON-RETURN VALVE FOR CAMSHAFT ADJUSTERS WITH OIL RESERVOIRS

(71) Applicant: Schaeffler Technologies AG & Co. KG, Herzogenaurach (DE)

(72) Inventor: Michael Busse, Herzogenaurach (DE)

(73) Assignee: Schaeffler Technologies GmbH & Co. KG, Herzogenaurach (DE)

(*) Notice: Subject to any disclaimer, the term of this patent is extended or adjusted under 35 U.S.C. 154(b) by 0 days.

(21) Appl. No.: 13/739,279

(22) Filed: Jan. 11, 2013

(65) Prior Publication Data
US 2013/0199473 A1    Aug. 8, 2013

(30) Foreign Application Priority Data
Feb. 2, 2012  (DE) .......................... 10 2012 201 563

(51) Int. Cl.
*F01L 1/34*  (2006.01)

(52) U.S. Cl.
USPC .................................... 123/90.17; 123/90.15

(58) Field of Classification Search
USPC ................................ 123/90.15, 90.17, 90.31
See application file for complete search history.

(56) References Cited

U.S. PATENT DOCUMENTS

| | | | |
|---|---|---|---|
| 2012/0001295 A1 | 1/2012 | Kurz et al. | |
| 2012/0111295 A1* | 5/2012 | Plate et al. | 123/90.15 |

FOREIGN PATENT DOCUMENTS

| | | |
|---|---|---|
| WO | 2011032805 | 3/2011 |
| WO | 2011138136 | 11/2011 |

* cited by examiner

*Primary Examiner* — Zelalem Eshete
(74) *Attorney, Agent, or Firm* — Volpe and Koenig, P.C.

(57) ABSTRACT

A camshaft adjuster (4) for a camshaft (12) of an internal combustion engine (2). The camshaft adjuster (4) includes a stator (20), a rotor (22) accommodated concentrically in the stator (20) and rotatable with respect to the stator (20) about an axis of rotation (78), and a volume reservoir (70) for receiving a hydraulic fluid from a pressure chamber (44) formed between the rotor (22) and the stator (20), wherein the volume reservoir (70) has an outlet (76) in a direction of the axis of rotation (78).

10 Claims, 5 Drawing Sheets

NON-RETURN VALVE FOR CAMSHAFT ADJUSTERS WITH OIL RESERVOIRS

INCORPORATION BY REFERENCE

The following documents are incorporated herein by reference as if fully set forth: German Patent Application No. 10 2012 201 563.9, filed Feb. 2, 2012.

FIELD OF THE INVENTION

The invention relates to a non-return valve for closing a channel between a volume reservoir and a pressure chamber in a camshaft adjuster, a rotor of a camshaft adjuster having the non-return valve and a camshaft adjuster having the rotor.

BACKGROUND

Camshaft adjusters are technical subassemblies for adjusting the phase angles between a crankshaft and a camshaft in an internal combustion engine.

WO 2011/032805 A1 discloses arranging a volume reservoir in a hydraulically operating camshaft adjuster, in order to avoid a negative pressure in a pressure chamber of the camshaft adjuster.

WO 2011/138136 A1 has disclosed closing a channel between the volume reservoir and the pressure chamber with a non-return valve arranged in the pressure chamber.

SUMMARY

It is an object of the invention to improve the known non-return valve.

The object is achieved by one or more of the features of the invention. Preferred developments are described below and in the claims.

The invention provides forming the non-return valve in such a way that it can be held by the channel between the pressure chamber and the volume reservoir.

This is based on the thought that the known non-return valve is pressed axially by a spring onto an opening of the channel which is held on the vanes of the rotor of the camshaft adjuster via a clamp. This clamp is not only complicated and expensive in its production but also takes up overall space unnecessarily and unnecessarily causes weight in the camshaft adjuster.

On the basis of this thought, the invention is based on the idea that the non-return valve is not pressed axially onto the opening of the channel but merely has to be secured against slipping radially in the channel, since the axial contact force is in any case provided by the hydraulic fluid in the camshaft adjuster.

Therefore, the invention specifies a non-return valve for closing a channel between a volume reservoir and a pressure chamber in a camshaft adjuster. The non-return valve specified comprises a cover for closing the channel on the pressure chamber side and a fluid-permeable supporting element that can be inserted into the channel and projects axially from the cover to support the cover radially in the channel.

The supporting element can be fluid-permeable in any desired way. Thus, the supporting element can, for example, have a net-like or pore-like structure, through which the hydraulic fluid can flow. Alternatively or additionally, the supporting element can run conically outward, as viewed from the cover, so that it acts like a plug which lets fluid from the channel into the pressure chamber when the cover is forced axially away from the channel by the pressure from the volume reservoir on account of a negative pressure in the pressure chamber. If, conversely, a higher pressure is then built up in the pressure chamber again, the conically tapering supporting element, which holds the non-return valve radially in the channel, acts like a guide, centers the cover on the corresponding opening of the channel. Further possible way of forming the supporting element to be fluid-permeable are indicated below.

The supporting element on the cover can be pushed in a straightforward manner into the channel between the pressure chamber and the volume reservoir which, in addition to the aforementioned advantages, also simplifies the mounting of the non-return valve in the camshaft adjuster.

In a development of the invention, the supporting element comprises at least two rods spaced apart axially. These rods can fix the non-return valve to the walls of the channel without any radial play of the non-return valve, it being possible for hydraulic fluid to continue to flow through between the spaced rods.

In an additional development, at the ends of the rods opposite to the cover, viewed outward from the center of the cover, there are formed radially outwardly directed hooks for insertion into the volume reservoir. The hooks act like axial loose supports which delimit the axial movement clearance of the non-return valve in the channel, so that the non-return valve can be fixed in the camshaft adjuster without further retaining devices.

In a particular development, the rods are formed so as to be radially resilient. This means that the rods, viewed outward from the center of the cover, can be resiliently bent radially outward or radially inward. This facilitates in particular the mounting of the non-return valve with hooks formed on the rods, which can now simply be pushed into the channel, hooks automatically moving radially apart when these dip into the volume reservoir at the other end of the channel.

The non-return valve can be an injection molded part and thus be produced in a particularly beneficial way in mass production.

The material of the non-return valve can be plastic, which, as compared with other materials like steel, has a low mass and thus a low moment of inertia. Therefore, the dynamic response of the non-return valve is improved, so that the non-return valve specified can open and close more quickly in comparison with ball non-return valves.

Should the pressure from the pressure chamber not be sufficient to force the cover of the non-return valve onto the opening of the channel, then a restoring element can be arranged on the hooks of the non-return valve and, for example, can be oppositely mounted on the wall of the volume reservoir. This restoring element can have a supporting action when closing the channel with the cover, by forcing the hooks of the non-return valve away from the wall of the volume reservoir.

The invention also specifies a rotor for a camshaft adjuster which has a hub, at least one vane projecting radially from the hub and having a volume reservoir formed in the vane which, via a channel running circumferentially through the vane to the hub, as viewed outward from the volume reservoir, is open to the outside, and comprises a specified non-return valve placed on the channel from outside, as viewed outward from the volume reservoir.

In a preferred development of the invention, a distance between the cover and the hook is greater than a length of the channel, so that the cover has an axial clearance to open the channel and to let hydraulic fluid out of the volume reservoir of the vane into the pressure reservoir, which the vane adjoins, when the rotor is installed in the camshaft adjuster.

In another development of the invention, the rods of the supporting element bear on a wall of the channel. In this way, the radial play of the non-return valve in the channel is restricted to zero.

In a particular development of the invention, an outwardly directed opening of the channel, viewed outward from the volume reservoir, is chamfered. In other words, the opening which is directed into that pressure reservoir of the camshaft adjuster which contains the specified rotor is chamfered. By means of the chamfer, the hooks of the non-return valves are automatically pressed together radially as they are pushed into the channel, so that the installation of the non-return valve in the rotor can be configured particularly simply.

In an additional development of the invention, the vane in the region of an outwardly directed opening of the channel has a depression oriented in the peripheral direction, in which the cover of the non-return valve can be accommodated. In this way, the vane of the rotor can butt up against a corresponding wall of the stator, co-determining the pressure chamber.

Alternatively or additionally, however, the cover can also be used as a stop buffer between the vane and the wall of the rotor and be countersunk only partly or even not at all in the vane.

On the radial side opposite to the hub, the vane can comprise a sealing strip, with which, when the rotor is installed in a camshaft adjuster, a leakage flow between the pressure chambers can be reduced.

The invention also specifies a camshaft adjuster for adjusting a phase shift between a crankshaft and a camshaft of an internal combustion engine. The specified camshaft adjuster comprises a stator for picking up rotational energy from the crankshaft and a specified rotor, rotatably mounted with respect to the stator, for giving up the rotational energy to the camshaft.

BRIEF DESCRIPTION OF THE DRAWINGS

Exemplary embodiments of the invention will be explained in more detail below by using a drawing, in which.

DETAILED DESCRIPTION OF THE PREFERRED EMBODIMENTS

In the figures, identical elements are provided with identical designations and described only once.

Figure 1:
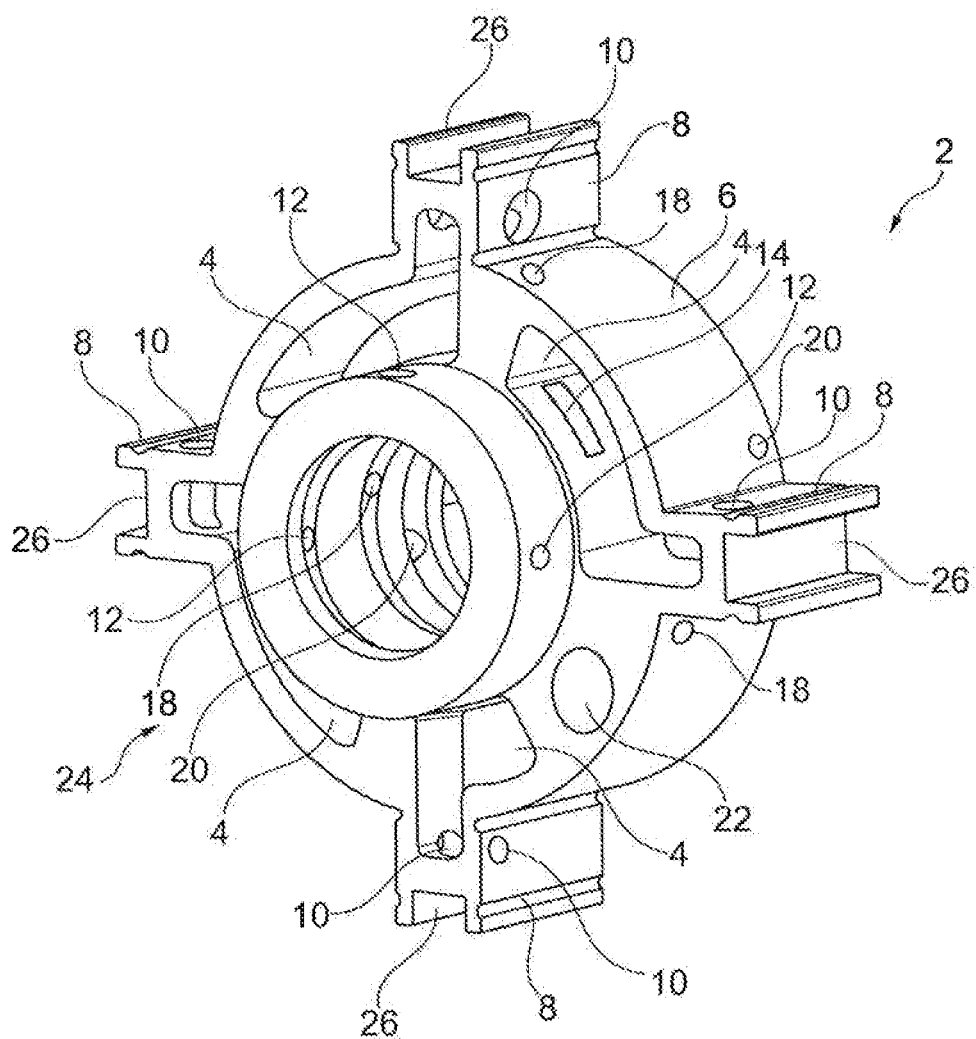
FIG. 1 is a perspective view of a rotor with volume reservoirs.

Reference is made to FIG. 1, which shows a perspective view of a rotor 2 having four volume reservoirs 4.

The volume reservoirs 4 are formed in a hub 6 of the rotor 2 and each extend in vanes 8 which project radially from the hub 6. The vanes 8 each have drilled holes 10 passing in the circumferential direction through the volume reservoirs 4, which are used as channels to supply pressure chambers, not shown, which bound the vanes 8 in a stator, not shown, of a camshaft adjuster.

The volume reservoirs 4 can be filled with a hydraulic fluid via supply connections 12 in a manner known from the prior art. Via what is known as an overflow opening 14, the hydraulic fluid can be led onward in a known way to a tank connection. As a result of the rotation of the rotor 2 during operation, the hydraulic fluid is forced firstly into the vanes of the rotor 2 before excess hydraulic fluid can flow away via the radially inner overflow opening 14.

The rotor also has, in a manner known per se, A-ports 18 and B-ports 20, via which the pressure chambers of the camshaft adjuster can be filled and emptied.

A locking pin, with which the rotor 2 can be locked in its position with respect to the stator, can be accommodated in a receiving opening 22, so that rotation of the two components in relation to each other is prevented.

During operation, the rotor 2 is seated on a camshaft, not shown, which is accommodated by the hub 6 in a passage opening 24. It is possible to arrange the central valve for the operation of the camshaft adjuster in the interior of the camshaft, for example.

Formed on the radial tips of the vanes 8 are radial notches 26, in which a sealing strip can be accommodated, which will be discussed at a later point.

Figure 2:
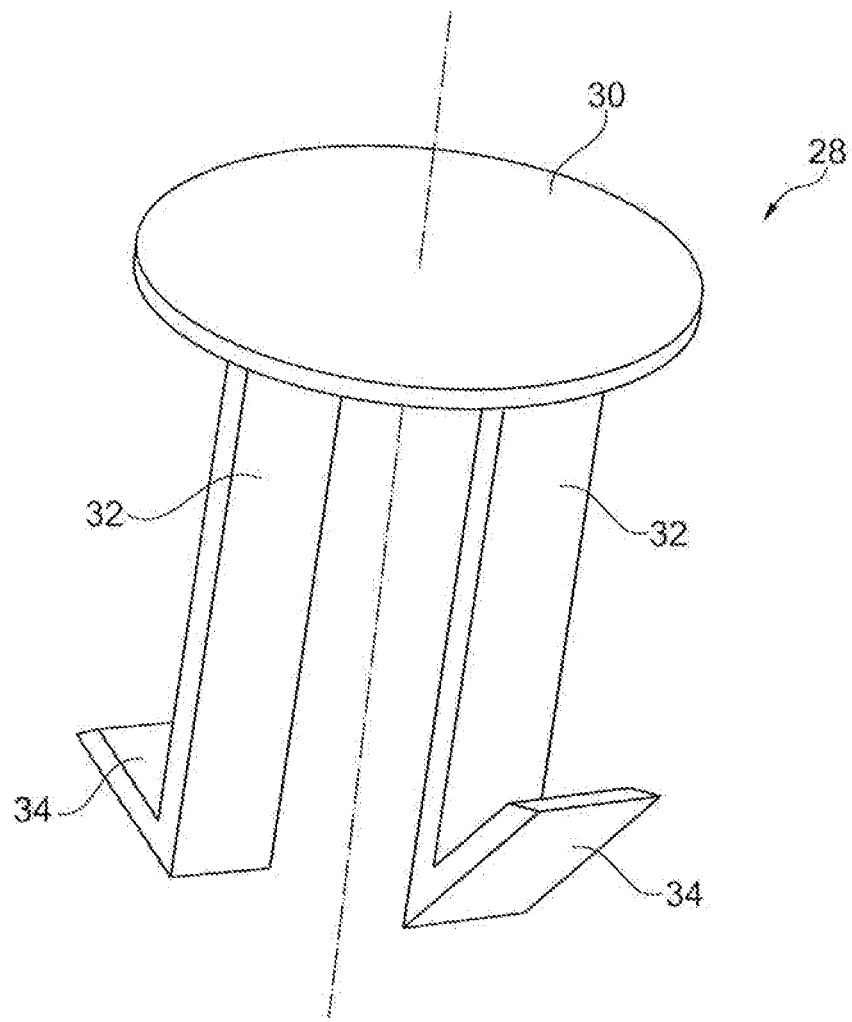
FIG. 2 is a perspective view of a specified non-return valve.

Reference is made to FIG. 2, which shows a perspective view of a specified non-return valve 28.

The non-return valve 28 has a cover 30, on which two rods 32 extend axially. At the axial end of the rods 32 opposite to the cover 30 there are arranged hooks 34 directed radially outward. The rods 32 can be pressed together radially at the hooks 34 and then spring resiliently back into their starting position again.

To install the non-return valve 28 in one of the channels 10, the hooks 34 are pressed together and pushed into the appropriate channel 10 from the side opposite to the volume reservoir 4. Once the hooks 34 move out of the channel 10 again in the volume reservoir 4, they spring resiliently apart and prevent the non-return valve 28 from slipping axially out of the channel 10 again. In this way, all eight channels 10 of the rotor 10 shown in FIG. 1 are provided with a non-return valve 28.

In the present exemplary embodiment, the rods 32 are formed with a rectangular cross section. However, they can be formed with any desired cross-sectional shape. Thus, the rods can for example be round, square or elliptical in their cross section. In addition, the rods 32 do not have to be straight but to some extent can be of curved design, as long as the hooks 34 can be led through the channels 10 and can be hooked over the edges of the corresponding channel 10 at the other end.

Figure 3:
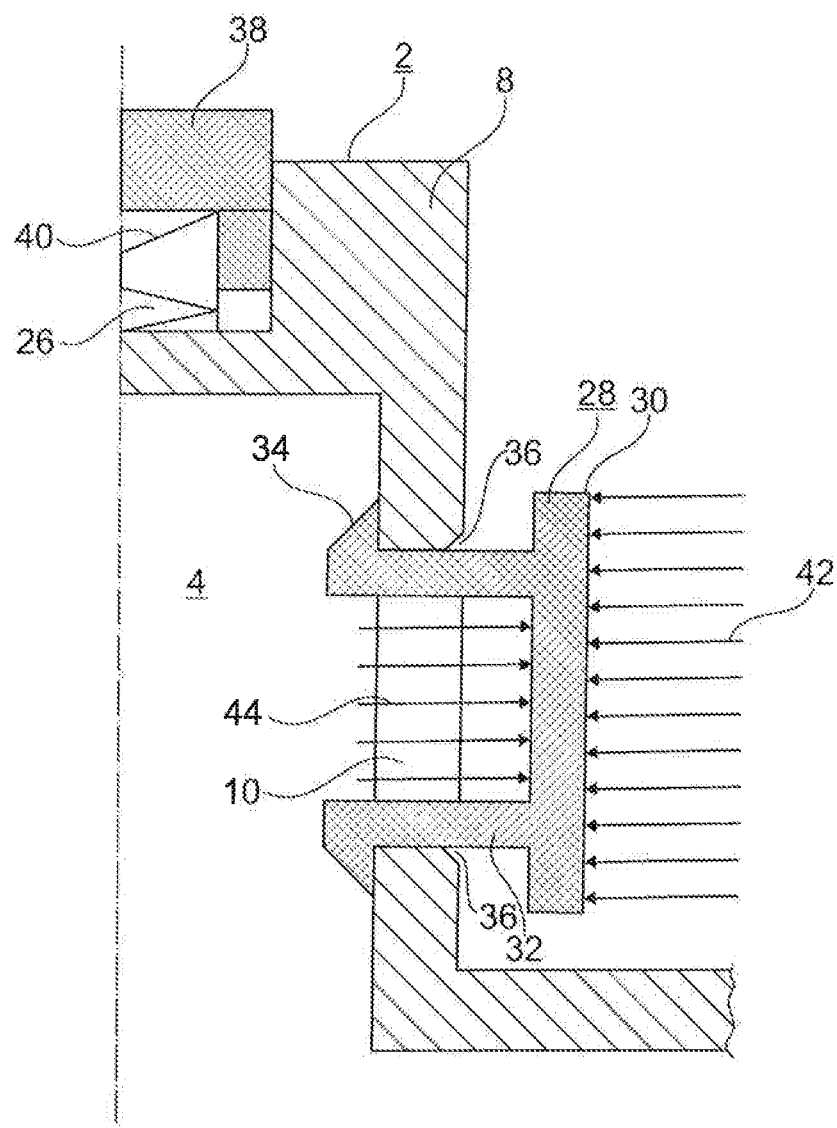
FIG. 3 is a sectional view of the non-return valve from FIG. 2 in the rotor from FIG. 1.

Reference is made to FIG. 3, which shows a sectional view of the non-return valve 28 from FIG. 2 in the rotor 2 from FIG. 1.

As can be seen from FIG. 3, the channels 10 can have a chamfer 36 on the side opposite to the volume reservoir 4, which makes it easier to push the hooks 34 into the channels 10 and to press them together.

Furthermore, FIG. 3 shows the sealing strips 38 which, for example, can be supported in the notches 26 via a sealing strip spring 40, in order that said strips can be placed tightly against a corresponding wall of the stator.

During operation of the camshaft adjuster with the rotor 2 and the non-return valves 28 inserted therein, the channels 10 closed by the non-return valves 28 are closed when a compressive force 42 from the pressure chambers is greater than a compressive force 44 from the volume reservoir 4. However, if a negative pressure occurs in the pressure chambers, so that the compressive force 42 is lower than the compressive force 44, the non-return valve 28 opens the channel 10, so that hydraulic fluid from the volume reservoir 4 can penetrate into the pressure reservoir in the manner known from the prior art, in order to compensate for the negative pressure in the pressure chamber 10.

Figure 4:
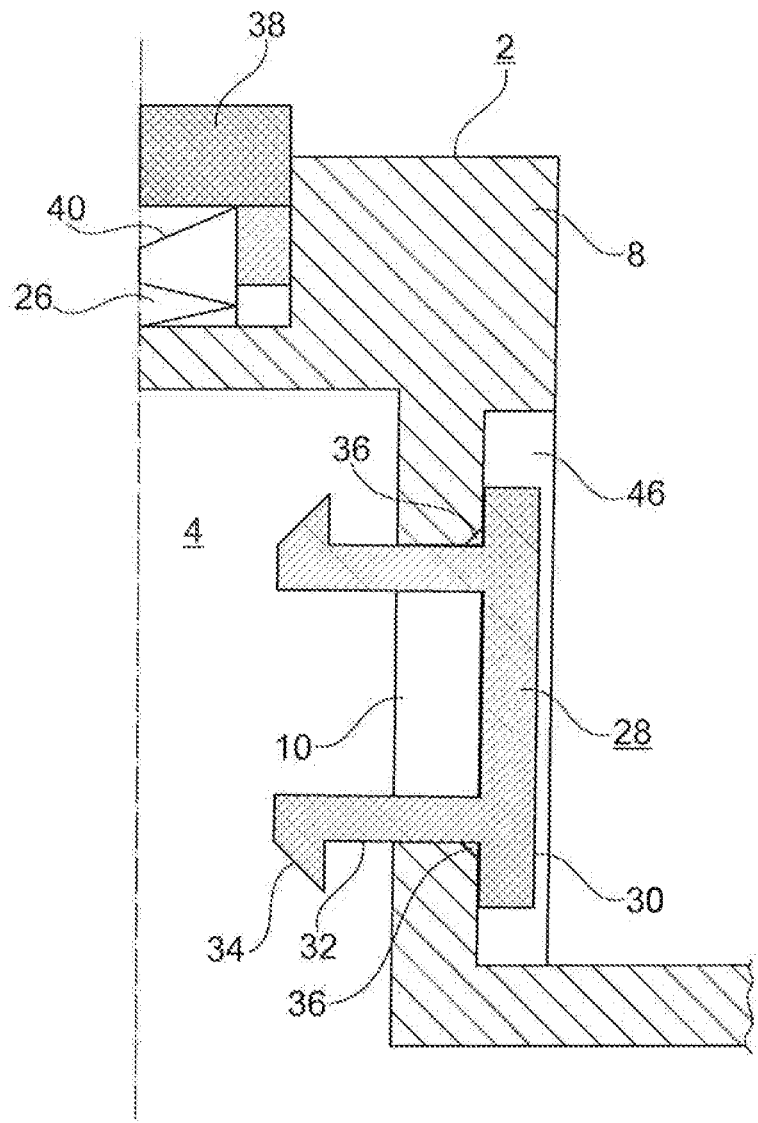
FIG. 4 is a sectional view of the non-return valve from FIG. 2 in the rotor from FIG. 1 with a development.

Reference is made to FIG. 4, which shows a sectional view of the non-return valve from FIG. 2 in the rotor from FIG. 1 with a development. The development is provided in that the cover 30 of the non-return valve 28 is accommodated in a cut-out depression 46, so that a wall, not shown, of the stator bounding the pressure chamber can butt up against the vane 8 of the rotor 2.

Figure 5:
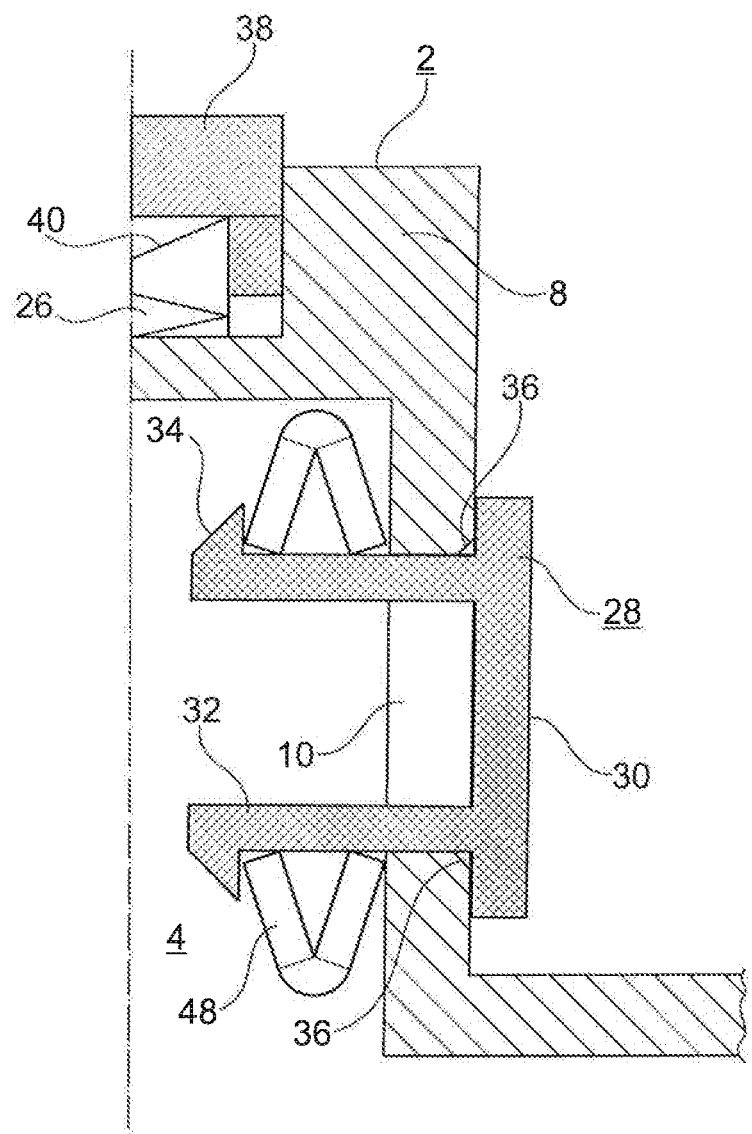
FIG. 5 is a sectional view of the non-return valve from FIG. 2 in the rotor from FIG. 1 with an additional development.

Reference is made to FIG. 5, which shows a sectional view of the non-return valve from FIG. 2 in the rotor from FIG. 1 with an additional further development. The further development is provided in that the hooks 34 can be forced away from the wall of the volume reservoir 4 by a spring element 48 formed as a disk spring, in order to assist the closure of the channel 10 by the cover 38.

LIST OF REFERENCE NUMBERS

2 Rotor
4 Volume reservoir
6 Hub
8 Vane
10 Drilled hole
12 Supply connection
14 Overflow opening
18 A-port
20 B-port
22 Accommodation opening
24 Passage opening
26 Notches
28 Non-return valve
30 Cover
32 Rod
34 Hook
36 Chamfer
38 Sealing strip
40 Sealing strip spring
42 Compressive force
44 Compressive force
46 Depression
48 Spring element

The invention claimed is:

1. A non-return valve for closing a channel between a volume reservoir and a pressure chamber in a camshaft adjuster, comprising a cover for closing the channel on a pressure chamber side and a fluid-permeable supporting element that is insertable into the channel and projects axially from the cover to support the cover radially in the channel.

2. The non-return valve as claimed in claim 1, wherein the supporting element comprises at least two rods spaced apart axially.

3. The non-return valve as claimed in claim 2, wherein, at ends of the rods opposite to the cover, viewed outward from a center of the cover, there are formed radially outwardly directed hooks for insertion into the volume reservoir.

4. The non-return valve as claimed in claim 2, wherein the rods are radially resilient.

5. A rotor for a camshaft adjuster comprising a hub, at least one vane projecting radially from the hub and having a volume reservoir formed in the vane which, via a channel running circumferentially through the vane to the hub, as viewed outward from the volume reservoir, is open to outside, and a non-return valve as claimed in claim 1 located in the channel from outside, as viewed outward from the volume reservoir.

6. The rotor as claimed in claim 5, wherein a distance between the cover and the hook is greater than a length of the channel.

7. The rotor as claimed in claim 5, wherein the rods of the supporting element bear on a wall of the channel.

8. The rotor as claimed in claim 5, wherein an outwardly directed opening of the channel, viewed outward from the volume reservoir, is chamfered.

9. The rotor as claimed in claim 5, wherein the vane in a region of an outwardly directed opening of the channel has a depression oriented in a peripheral direction, in which the cover of the non-return valve can be accommodated.

10. A camshaft adjuster for adjusting a phase change between a crankshaft and a camshaft of an internal combustion engine, comprising a stator for receiving rotational energy from the crankshaft and a rotor as claimed in claim 5, rotatably mounted with respect to the stator, for transferring the rotational energy to the camshaft.

* * * * *